Feb. 13, 1968   R. M. WILCOX   3,368,850
SLOT TYPE HYDROSTATIC BEARINGS
Filed May 27, 1965   4 Sheets-Sheet 1
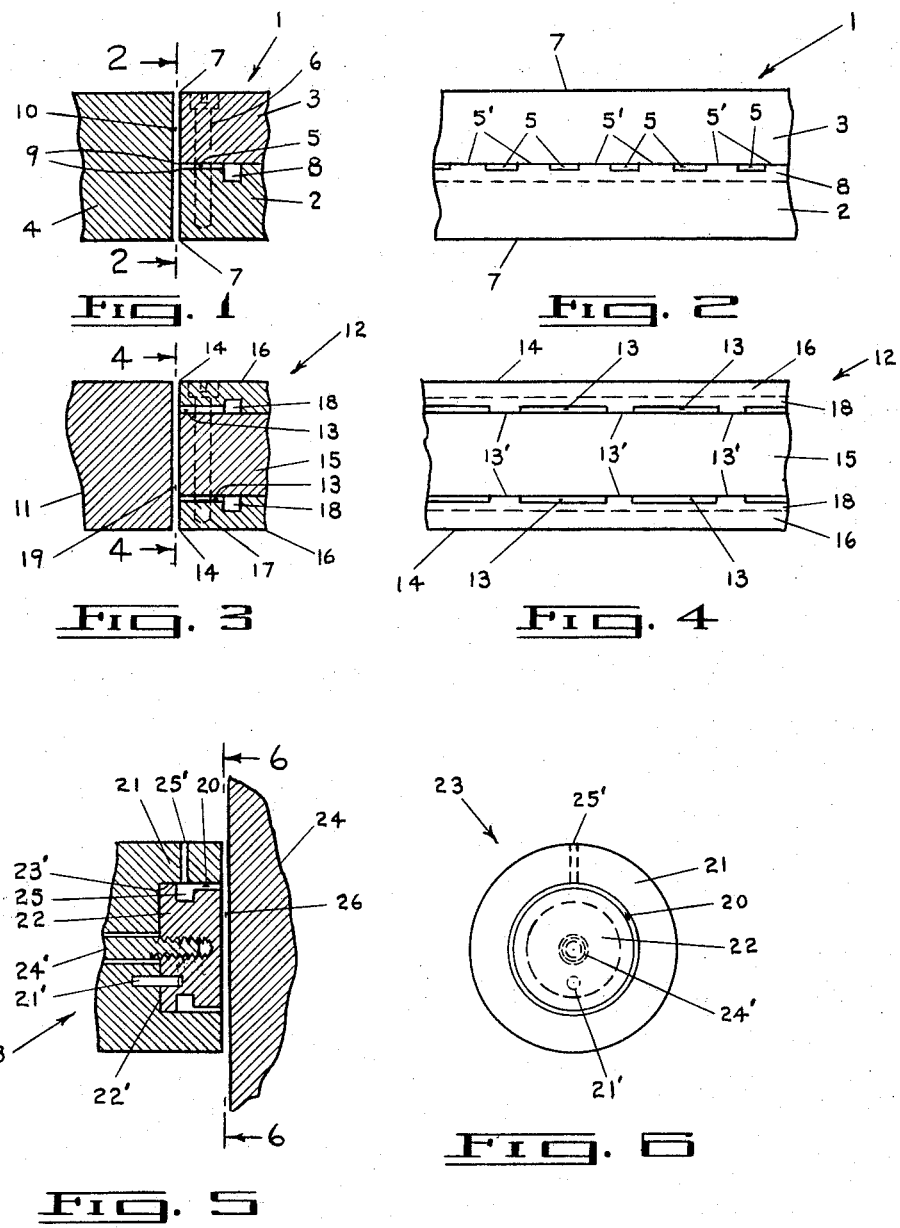
INVENTOR
Roy M. Wilcox
BY  m.a.Hobb
ATTORNEY Feb. 13, 1968 R. M. WILCOX 3,368,850
SLOT TYPE HYDROSTATIC BEARINGS
Filed May 27, 1965 4 Sheets-Sheet 3

INVENTOR.
Roy M. Wilcox
BY
M. G. Hobbs
Att.

INVENTOR.
Roy M. Wilcox
BY M. A. Hobbs
ATTORNEY

United States Patent Office 3,368,850
Patented Feb. 13, 1968

3,368,850
SLOT TYPE HYDROSTATIC BEARINGS
Roy Milton Wilcox, 2803 Locust Lane,
South Bend, Ind. 46615
Continuation-in-part of application Ser. No. 221,176,
Sept. 4, 1962. This application May 27, 1965, Ser.
No. 459,364
12 Claims. (Cl. 308—5)

ABSTRACT OF THE DISCLOSURE

For slot type hydrostatic gas bearings which require very thin uniform slots to restrict flow and prevent gas vibration, two uniformly close fitting opposed bearing members one of which is separable at an $R_1$ slot feeding and distributing pressure gas to between the bearing surfaces. The walls of the slot are maintained in uniform close proximity by periodic lands on one wall with screws through the lands. The continuously parallel bearing surfaces and this very thin uniform slot provide pressure distribution without vibration-causing gas pockets in unrestricted communication with the load carrying elastic film. An interface equidistant from each of the separable bearing surfaces maintains exact bearing surface alignment.

---

The invention relates to bearings and more particularly slot type hydrostatic bearings; and this application is a continuation-in-part of my copending U.S. patent application Ser. No. 221,176 filed Sept. 4, 1962, now U.S. Patent Number 3,186,774.

In that application it is explained that, to avoid vibration and depending on bearing size, the thickness of the slots forming the $R_1$ restriction, must be less than .0008 inch, for example. In addition, since the opposed surfaces of hydrostatic bearings do not touch and the pressure fluid supplied to these bearings is filtered, wear and friction at normal speeds are non-existent. Therefore hydrostatic bearings are particularly useful in highly accurate and necessarily expensive instruments and machinery. However, in any hydrostatic bearing using gas or liquid, to achieve maximum bearing stiffness $S=dl/dt$, the film thickness and therefore the $R_1$ inlet slot thickness must be minimized as described in U.S. Patent 2,683,635 issued July 13, 1954 and illustrated in FIGURE 18 thereof.

Furthermore, to minimize internally generated bearing torque in gyro gimbals for example, caused by an unsymmetrical flow through these bearings, the very thin $R_1$ slot described above must be as circumferentially symmetrical as possible. Additionally in a rotary hydrostatic bearing, the $R_1$ slot thickness must be accurately proportioned in respect to bearing clearance, to provide maximum radial load capacity.

Although heretofore considered impractical, it is therefore a main object of the invention to provide slot type bearings having the freedom from vibration, friction and wear and having the stiffness, accuracy and symmetry described above, that are practical to manufacture.

In addition to providing an hydrostatic bearing inlet and distribution passage having the above characteristics, it is another object of the invention to provide such an inlet which will be adaptable to a large variety of hydrostatic bearings and will enable bearings to be constructed in a large variety of simple geometic forms.

That is, another important object is to provide an $R_1$ slot inlet which can be readily serviced to maintain it free from contamination, or if plugged either during manufacture or in use can be readily dismantled, deburred, cleaned and reassembled without disturbing in any way the accuracy of the bearing.

A further object of the invention is to provide, in slot type rotary hydrostatic bearings, one or more circumferential discontinuities in the load supporting film to prevent rotation of the viscous film wedge, generally known as half speed whirl.

In the preferred form of the invention, $R_1$ slots, restricting and distributing pressure fluid to the load supporting film are contained in the abutting interface of two members of one bearing surface. The lands between these slots in combination with means for holding the abutting surfaces together provide the $R_1$ slot accuracy required above, that is, distortion of the slot thickness due to:

(a) the fluid pressure within the bearings,
(b) the clamping force required to hold the above two bearing members together,
(c) inaccuracies in the surfaces which otherwise locate the above two bearing members, can be minimized and kept within the limits described above. Furthermore, the thickness of each slot can be accurately formed and measured by reference to the adjacent lands.

These and other objects and features of the invention will become apparent from the following description taken in conjunction with the accompanying drawings, in which:

FIGURE 1 is a fragmentary vertical cross-sectional view of one form of bearing constructed in accordance with the invention;

FIGURE 2 is a view taken on the line 2—2 of FIGURE 1;

FIGURE 3 is a view similar to FIGURE 1, but showing the invention applied to a slightly different form of bearing;

FIGURE 4 is a view taken on the line 4—4 of FIGURE 3;

FIGURE 5 is a fragmentary, vertical sectional view of a bearing constructed in accordance with the further embodiment of the invention;

FIGURE 6 is a view taken on the line 6—6 of FIGURE 5;

Figure 7:
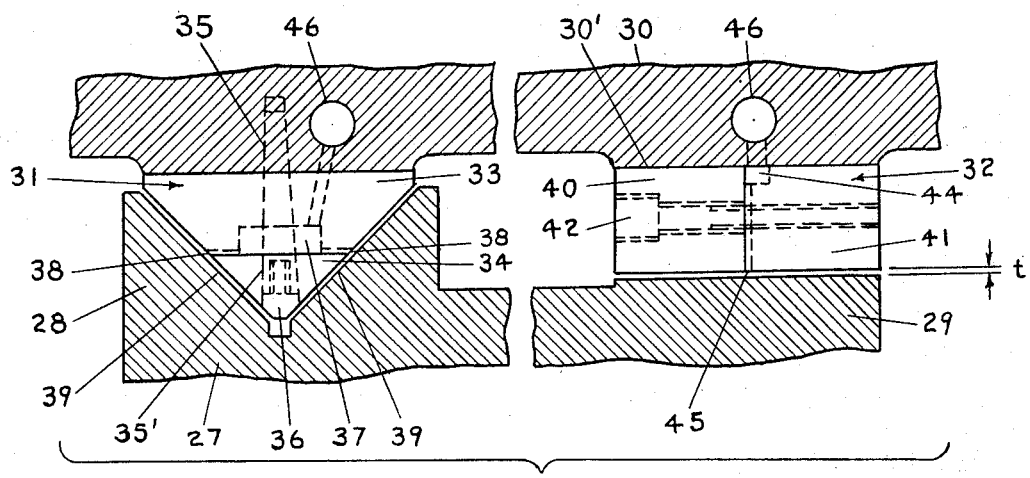
FIGURE 7 is a transverse, fragmentary vertical sectional view showing the application of the invention to the ways of, for instance, a grinding machine.

As shown in the drawings particularly FIG. 2 and to provide definition herein, a slot type bearing is one in which the length of slot from one land or spacer to the next land or spacer is at least four times the slot thickness, the thickness being the distance between the walls of the slot.

In an hydrostatic bearing a continuous unbroken lubricating gas or liquid film is supported or maintained by pressure fluid flow through a restriction, hereinafter called the $R_1$ restriction, between the filtered pressure fluid source and the film. The pressure fluid escapes from the bearing at the bearing perimeter and the passage or restriction, hereinafter called the $R_2$ restriction, through which the pressure fluid escapes is dependent on the separation of the bearing members, that is film thickness, which of course varies under bearing loading. At maximum load the bearing members are lightly contacting.

Using air as a lubricant, it may be allowed to escape to the atmosphere. However using most other fluids, it is necessary or desirable to provide means adjoining the bearing for collecting the exhausted fluid.

The characteristic of an hydrostatic bearing is that as soon as fluid pressure is applied to the bearing the bearing surfaces are completely separated by a continuous filtered fluid film. The thickness of this film is regulated by the interaction of the above $R_1$ and $R_2$ restrictions as described in U.S. Patent 2,683,635 and illustrated in FIGURE 19 thereof.

In the bearing of FIGURES 1 and 2, one of the bearing members, generally designated at 1, is formed of two component parts 2 and 3, while the opposing bearing member 4 may comprise a solid part. One of the components 2 of the bearing member 1 is formed with very shallow recesses 5 in the face thereof. The lands 5' between the recesses 5 abut the component 3, so that on assembly of the components, by means of suitable screws 6, there is formed centrally of the bearing member 1 a slot formation $R_1$ formed by the recesses 5 which extends linearly and centrally of the bearing midway between the edges 7.

The component 2 is also formed with a longitudinal groove 8 which on assembly of the components 2 and 3 forms a supply passage adapted to be connected to a source of compressed gas. The slots 5 formed on assembly of the components 2 and 3 afford a restricted gas flow passage formation $R_1$ leading from the supply passage 8 to between the bearing members 1 and 4 to supply pressure gas to support a lubricating gas film 10 between the opposing parallel surfaces of the bearing. Preferably, the edges of the slots 5 are slightly rounded as at 9 to reduce turbulence.

The slots 5 thus form a central linear feed midway between the bearing edges so as to provide essentially uniform supply pressure in the center of the lubricating film 10 lengthwise of the bearing under heavy load.

Since resistance to flow in such thin films corresponding to the film 10 is purely viscous, and flow is laminar, the resistance to flow is inversely proportional to film thickness cubed, and flow is therefore low in velocity and small in quantity. At light load, most of the pressure drop is in the slot formation $R_1$, so that film pressure is low even though the film thickness may only have increased, say .0005 inch.

The load factor, that is, the maximum load which the bearing can support, divided by the product of supply pressure and bearing area with the type of bearing illustrated in FIGURES 1 and 2, is approximately 0.5.

The number of pairs of recesses 5 and lands 9 depends on hte supply pressure, the stiffness of components 2 and 3 and the degree of $R_1$ slot formation accuracy required as described in the general statement of the object of the invention. That is, by limiting the distance between the lands, distortion, otherwise caused by the clamping force necessary to hold components 2 and 3 together against the internal fluid pressure, is controlled. In addition, the extremely shallow recesses 5 can be accurately formed and measured by direct reference to an adjacent land.

In FIGURES 3 and 4, the slot formation for delivering pressure fluid to between the bearing members 11 and 12 comprises a pair of linear interrupted slot formations comprised by the aligned very shallow slots 13, which extend parallel to each other and to the bearing edges 14. Again, these slots are formed by having the bearing member 12 formed of component parts comprising a central member 15 and side members 16 having very shallow recesses or grooves therein, which on assembly with the central member form the slots 13 and lands 13'. Suitable assembly screws 17 are provided and the side members 16 are also grooved as at 18 to form supply passages in communication with the slots 13, which supply passages are adapted to be connected to a source of pressure fluid.

It will be seen that the slot bearing of FIGURES 3 and 4 has the slot formations bordering the bearing's perimeter so as to provide a large area of load-carrying film between the parallel slots, which film will be at essentially supplied pressure when the film thickness approaches zero under heavy load.

With a bearing construction such as shown in FIGURES 3 and 4, the load factor is somewhat higher than the load factor of the bearings of FIGURES 1 and 2, and may approach approximately 0.8.

The bearing illustrated in FIGURES 5 and 6 is similar to the bearing of FIGURES 3 and 4, except that the slot formation 20, which is a continuous slot, is annular and is formed by the assembly of the component bearing parts 21 and 22, which make up the one bearing member 23, while the opposing bearing member 24 may comprise a single member. The bearing parts 21 and 22 are held in assembled relation by pin 21' fastening screw 24', bearing surface alignment interface 22' and lands 23'. Again, the one bearing member 22 is formed so that it provides, on assembly with the component member 21, both the slot formation 20 and a supply passage 25. An inlet passage 25' connects with passage 25. In this case, as in the case of FIGURES 3 and 4, the compressed gas is introduced into the film 26 between the parallel bearing surfaces adjacent and parallel to the periphery of the bearing so as to provide a large area of load carrying film within the annular slot 20, which film is at essentially supply pressure when the film thickness approaches zero under heavy load.

Figure 8:
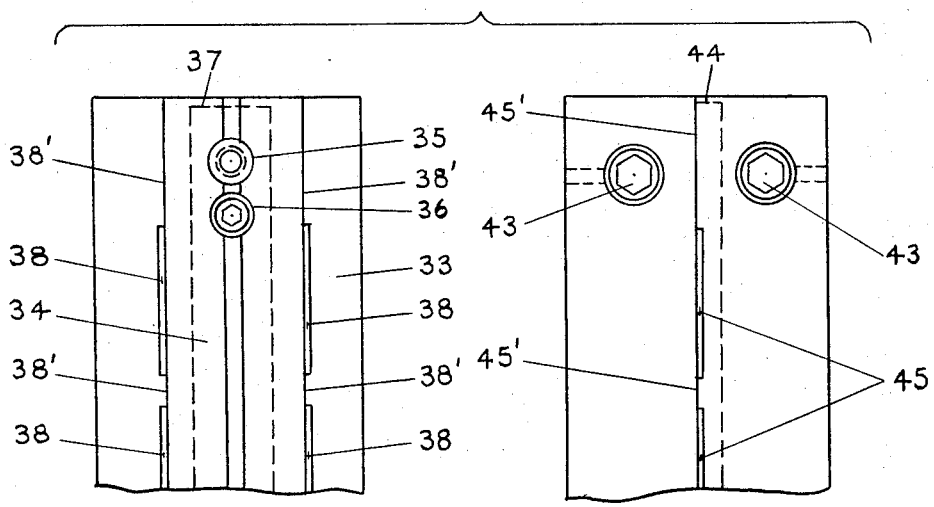
FIGURE 8 is a fragmentary underside plan view of the way members of the carriage of the machine of FIGURE 7.

FIGURES 7 and 8 illustrate a practical example where the bearing construction of FIGURES 1 and 2 may be successfully employed to provide important advantages in the accuracy of machine operation. In these figures, the numeral 27 represents the bed of a machine having a V way 28 and a flat way 29. The carriage 30 of the machine has way members generally designated at 31 and 32 for operating along the machine ways 28 and 29. The way member 31 is formed of component members 33, and 34, which are precisely related to the carriage 30 by tapered pins 35 having alignment interface 35' and which have threaded holes in their outer ends for their extraction.

Countersunk socket head screws 36 hold the precisely ground way components or pieces 33 and 34 to the carriage and seal supply channel 37 defined between the way components. The way components are formed to present on assembly with the carriage, linear $R_1$ slot formations 38 and lands 38' there between, extending longitudinally of and disposed centrally between the edges of the opposing faces 39 of the V way 28.

The way member 32 comprises the component way members or pieces 40 and 41, which pieces have their top alignment interfaces 30' and bottom surfaces ground precisely parallel so that their sideways position need not be precise.

Countersunk socket head screws 42 hold the way members 40 and 41 together, and similar screws 43 hold the members to the carriage 30. The component way members 40 and 41 are formed to provide on assembly with the carriage a supply channel 44 from which leads an $R_1$ slot formation comprising slots 45 and lands 45' there between and extending centrally and longitudinally of the flat way 29 to deliver compressed gas from the channel 44 to between the carriage way member 32 and the way 29. Suitable supply passages 46 may be formed in the carriage 30 for supplying compressed gas to the respective supply channels 37 and 44.

Figure 9:
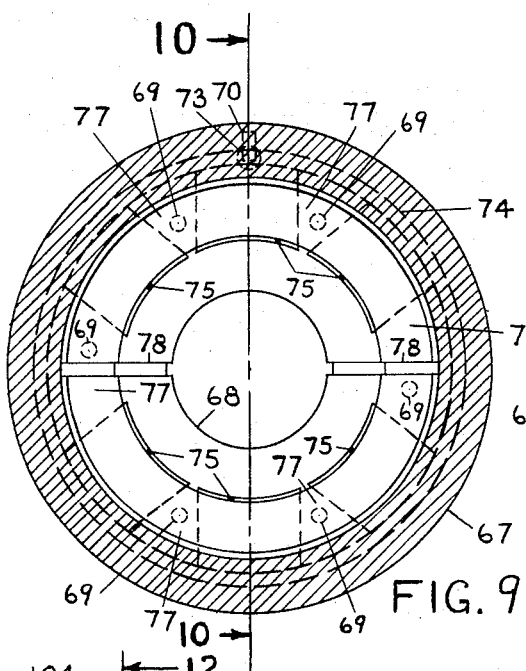
FIGURE 9 is a cross-sectional view taken on the line 9—9 of the bearing housing shown in FIGURE 10.
Figure 10:
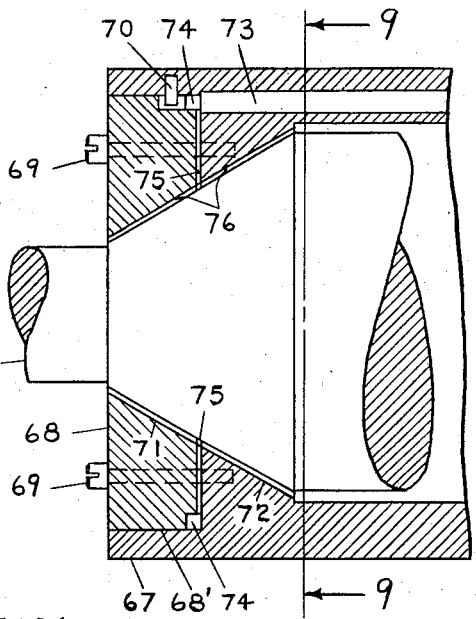
FIGURE 10 is a cross-sectional view taken on the line 10—10 of FIGURE 9 showing a rotary bearing embodying the invention.
Figure 16:
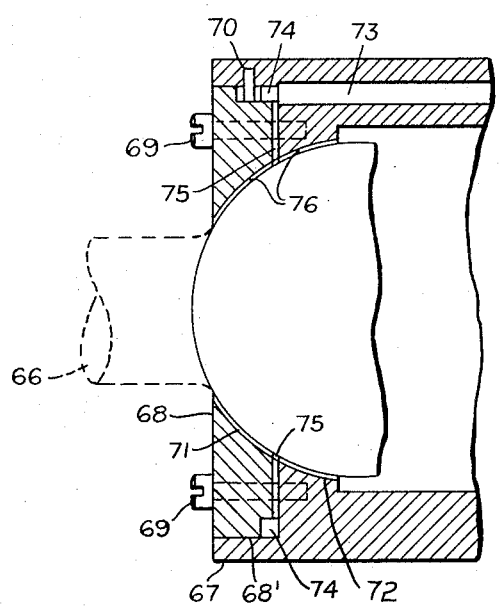
FIGURE 16 is a cross-section similar to FIG. 10 except that the tapered bearing surfaces have been replaced with spherical surfaces.

In the rotary, conical, cylindrical or spherical bearing of FIGURES 9 10 and 16, shaft or ball 66 rotates in housing 67. Housing 67 includes radially close fitting end pieces 68 held tightly against housing 67 by screws 69 and in bearing surface alignment by alignment interface 68'. Pin 70 assures that when the bearing is taken apart after finishing surfaces 71 and 72 and is put together again the accurate alignment of the surfaces 71 and 72 will not be disturbed. Housing 67 contains supply passage 73 connecting with the annular notch 74 in end piece 68. Between screws 69 very shallow $R_1$ slots 75 are formed in the inner face of end piece 68 and connect notch 74 with load carrying fluid film 76.

The number of lands 77 and screws 69 depends on the supply pressure, the stiffness of end cap 68 and the degree of accuracy required as described in the general statement of the object of the invention.

Exhaust grooves 78 may be formed in the housing bearing surfaces 71 and 72 so as to bisect the lands 77.

In operation the bearing of FIGURES 9, 10 and 16 performs as follows. Pressure fluid flows in through passage 73 and around notch 74 with negligible loss of pressure. The fluid then forces its way through $R_1$ slots 75 with varying pressure drops depending on the direction in which radial load is applied to the shaft or ball 66. Screws 69 are placed approximately in the middle of each land 77 so that distortion otherwise caused by the clamping force necessary to hold end piece 68 and housing 67 together against the internal fluid pressure, is eliminated. By limiting the distance between the pairs of lands 77 and screws 69 as described above all other distortions of the $R_1$ slot thickness may be kept within the limits described in the general statement of the objects of the invention. That is, slots 75, in spite of their extreme thinness, provide accurate and circumferentially symmetrical distribution of fluid to load carrying film 76 which continually seeps out both ends of the bearing.

Exhaust grooves 78 are included in bearings in which half speed whirl creates a vibration problem tending to destroy the bearing. This is likely to occur with low supply pressure and/or high viscosity fluid, at high speed. As explained in U.S. patent application Ser. No. 221,176 it is necessary to limit the pressure gradient in the load carrying film to avoid vibration. Therefore each groove 78 bisects a land 77 and each of these lands is sufficiently wide so as to regulate the pressure gradient between slots 75 and exhaust grooves 78. Furthermore, this novel arrangement reduces flow, thereby conserving fluid energy.

Figure 11:
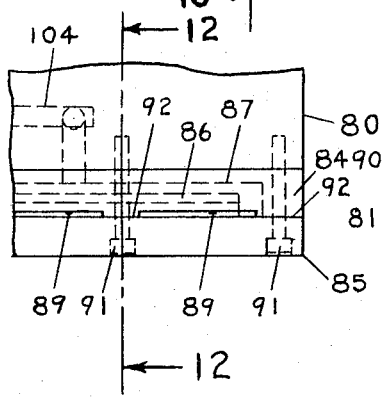
FIGURE 11 is a left side elevation of the carriage shown in FIGURE 12.
Figure 12:
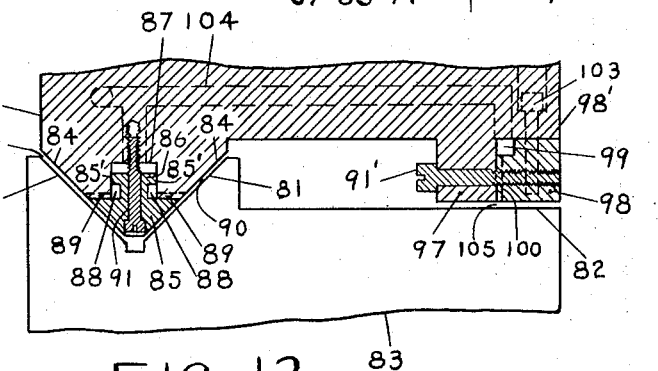
FIGURE 12 is the partially cross-sectional view taken on the line 12—12 in FIGURES 11 and 13 showing a linear bearing constructed in accordance with the invention.
Figure 13:
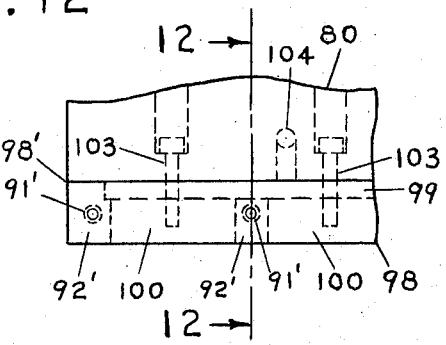
FIGURE 13 is the right side elevation of the carriage shown in FIGURE 12.

The linear slide of FIGURES 11, 12 and 13 is typical of a variety of bearings to which the invention may be applied having straight line or reciprocating motions. In these figures carriage 80 rides on V and flat ways 81 and 82 on bed 83.

V way bearing 84 includes V strip 85 having a laterally close fitting tongue 86 in groove 87. Close fitting alignment interfaces 85' align the bearing surfaces. Tongue 86 has grooves 88 on both sides and is either shorter than groove 87 or has holes connecting grooves 88 with the upper part of groove 87. Very thin $R_1$ slots 89 connect grooves 88 with the two load carrying films 90. Screws 91 hold V strip 85 tightly against the upper portion of V way bearing 84 at each land 92.

Flat way bearing 97 includes rectangular strip 98 containing notch 99 and very thin $R_1$ slots 100 in its face. The alignment interface 98' aligns the bearing surfaces. Screws 91' approximately through the center of each land 92' tightly hold strip 98 against the other half of way bearing 97. Screws 103 tightly hold strip 98 against carriage 80. As in the bearing of FIGURES 9 and 10 the spacing of each pair of lands 92 or 92' and screws 91 or 91' there through depends on the stiffness of the bearing members, the supply pressure and the degree of accuracy required as described in the general statement of the object of the invention. Also to provide uniform load carrying film thickness, the combined bearing faces of V and flat bearings 84–85 and 97–98 respectively are precisely finished to match V and flat ways 81 and 82.

In operation the bearings of FIGURES 11, 12 and 13 perform as follows. Pressure fluid is supplied through channel 104 to groove 87 and notch 99. From the upper part of groove 87 the fluid flows around or through tongue 86 into grooves 88, thus far with negligible pressure drop. The fluid then forces its way through $R_1$ slots 89 with varying pressure drop inversely dependent on bearing load thereby regulating the pressure in load carrying films 90. In addition, the fluid flows in the same manner from notch 99 through $R_1$ slots 100 to continually supply load carrying film 105.

Alternately and within the scope of the invention, the screws 69 in FIGURES 9 and 10 may be replaced with a ring threaded into housing 67 for holding the lands 77 of end piece 68 against housing 67. Similarly in the bearing of FIGURES 11, 12 and 13, screws 91 and 91' may be replaced with another type of fastening of which there are many. Where it can be guaranteed that the fluid supply will be adequately filtered and after deburring, the lands may be very thinly coated with a low melting point solder or cement and the abutting surfaces soldered or cemented together.

However it is to be particularly noted that the slot formation $R_1$ is in each case formed by the assembly of component bearing members such as the bearing members 2 and 3 in the bearing construction of FIGURE 1. Thus the slot is readily disassembled which is essential for practical manufacture. This will be appreciated when the thinness of the slot is considered.

In production, the bearing members 2 and 3 will be assembled, and their bearing surface opposing the opposite bearing member 4 may be ground to provide the requisite surface flatness and accuracy. The grinding of the bearing surface will produce a burr that will at least partially block the slot, and the bearing members can be readily taken apart to remove this burr from the slot to provide the accurate slot dimension.

Also, in the case of plugging of the slot due to dirt from the pressure fluid supply, the bearing members 2 and 3 can be quickly separated for cleaning to facilitate maintenance of bearing operation.

In the same way, the other bearings disclosed can be disassembled without affecting the bearing surface, and the slot can be taken apart for deburring and cleaning as described above.

Figure 14:
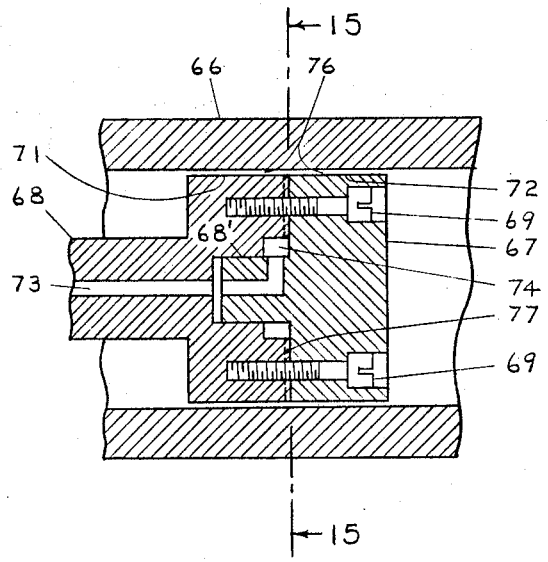
Figure 15:
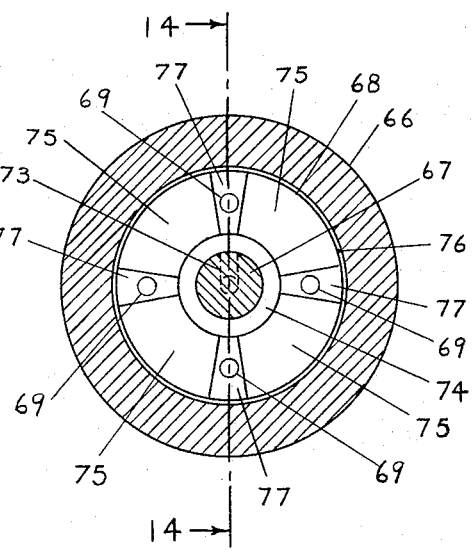

Alternately and within the scope of this invention, the bearing of FIGURES 9 and 10 in its cylindrical form, may reciprocate axially and/or rotate. This same construction, radially inverted, may be applied to a piston in a cylinder, as illustrated in FIGURES 14 and 15. If such a piston is supplied with a pressure gas it may be operated at extreme high or low temperatures, below the freezing point of oil for example, without friction.

It will be understood that while certain embodiments of the invention have been disclosed by way of illustration, such embodiments are for illustration purposes only and are not intended to limit the scope of the appended claims.

I claim:

1. A vibration-free slot type gas bearing having members with opposed continuously close fitting bearing surfaces, one of said members being separable into pieces through its bearing surface with means locating and maintaining said separable bearing surfaces in line with each other, said separable bearing member comprising an elongated supply channel, an elongated thin slot between said pieces connecting, distributing and regulating pressure gas flow from said supply channel to said separable bearing surfaces, a plurality of spacers in said slot, the average length of said slot from one spacer to the next being at least four times the thickness of said slot, and a separable fastening means holding said pieces together at said spacers to establish and maintain exact slot thinness, whereby the bearing can be manufactured and will remain free from vibration, friction and wear and has stiffness, accuracy and flow symmetry.

2. A vibration-free slot type gas bearing as claimed in claim 1 in which said fastening means passes through said spacers.

3. A vibration-free slot type gas bearing as claimed in claim 1 in which said separable fastening means are screws joining the walls of said slot and said screws pass through said spacers.

4. A vibration-free slot type gas bearing as claimed in claim 1 in which said locating means is an interface common to any plurality of said pieces and essentially equidistant from the lines of intersection of said slot with each of said separable bearing surfaces.

5. A vibration-free slot type gas bearing having members with opposed continuously close fitting bearing surfaces, one of said members being separable into pieces through its bearing surface with means locating and maintaining said separable bearing surfaces in line with each other, said separable bearing member comprising a supply channel, a thin slot between said pieces connecting and regulating pressure gas flow from said supply channel to said bearing surfaces, said supply channel and said slot being extended in a direction parallel with said bearing surfaces to distribute said pressure gas along said bearing surfaces, a plurality of spacers disposed in and terminating said slot, the average length of said slot from one spacer to the next being at least four times the thickness of said slot, and separable fastening means holding said pieces together at said spacers to establish and maintain exact slot thinness, whereby the bearing can be manufactured and will remain free from vibration, friction and wear and has stiffness, accuracy and flow symmetry.

6. A vibration-free slot type gas bearing having opposed members with circular continuously close fitting bearing surfaces, one of said members being separable into pieces through its bearing surface with means locating and maintaining said separable bearing surfaces in line with each other, said separable member comprising an annular supply channel, an annular thin slot between said pieces connecting, distributing and regulating pressure gas flow from said supply channel to said separable bearing surfaces and said slot comprising a plurality of spacers, the average length of said slot from one spacer to the next being at least four times the thickness of said slot, and separable fastening means holding said pieces together at said spacers to establish and maintain exact slot thinness, whereby the bearing can be manufactured and will remain free from vibration, friction and wear and has stiffness, accuracy and flow symmetry.

7. A vibration-free slot type gas bearing as claimed in claim 6 in which said bearing surfaces are cylindrical.

8. A vibration-free slot type gas bearing as claimed in claim 6 in which said opposed bearing surfaces are conical.

9. A vibration-free slot type gas bearing as claimed in claim 6 in which said opposed bearing surfaces are spherical.

10. An elongated vibration-free slot type gas bearing having members with opposed essentially flat continuously close fitting bearing surfaces, one of said bearing members being separable into pieces through its bearing surface, said separable member comprising an elongated supply channel, an elongated thin slot between said pieces parallel with the length of said bearing, said slot connecting, distributing and regulating pressure gas flow from said supply channel to said separable bearing surfaces, an interface common to any plurality of said pieces and essentially equidistant from and parallel with the lines of intersection of said slot and each of said separable bearing surfaces for their exact alignment, a plurality of spacers in said slot, the average length of said slot from one spacer to the next being at least four times the thickness of said slot, and a separable fastening means holding said pieces together at said spacers to establish and maintain an exact slot thinness, whereby the bearing can be manufactured and will remain free from vibration, friction and wear and has stiffness, accuracy and flow symmetry.

11. A vibration-free slot type gas bearing as claimed in claim 10 in which said spacers terminate said slot.

12. A vibration-free slot type gas bearing as claimed in claim 10 in which a separable fastener holds said pieces together at said interface.

References Cited

UNITED STATES PATENTS

| | | | |
|---|---|---|---|
| 2,095,313 | 10/1937 | Carter et al. | |
| 2,683,635 | 7/1954 | Wilcox | 308—122 |
| 3,026,150 | 3/1962 | Buckley et al. | 308—9 |
| 3,119,639 | 1/1964 | Adams | 308—9 |
| 3,132,903 | 9/1964 | Webb | 308—122 |
| 3,140,753 | 7/1964 | Bertin | 308—9 X |
| 3,186,774 | 6/1965 | Wilcox | 308—9 |

MARTIN P. SCHWADRON, *Primary Examiner.*

FRANK SUSKO, *Examiner.*